United States Patent
Danford-Klein et al.

[11] Patent Number: 6,061,667
[45] Date of Patent: May 9, 2000

[54] MODULAR RATING ENGINE, RATING SYSTEM AND METHOD FOR PROCESSING RATING REQUESTS IN A COMPUTERIZED RATING SYSTEM

[75] Inventors: Henrik Danford-Klein, Green Bay; John Kring, Suamico, both of Wis.

[73] Assignee: Schneider National, Inc., Green Bay, Wis.

[21] Appl. No.: 08/905,810

[22] Filed: Aug. 4, 1997

[51] Int. Cl.[7] .................................................. G06F 17/00
[52] U.S. Cl. .................. 705/400; 705/409; 705/406; 700/103
[58] Field of Search .................. 705/402, 409, 705/30, 400, 406

[56] References Cited

U.S. PATENT DOCUMENTS

| | | | |
|---|---|---|---|
| 4,286,325 | 8/1981 | Dlugos et al. | 705/402 |
| 4,713,761 | 12/1987 | Sharpe et al. | 705/30 |
| 5,337,246 | 8/1994 | Carroll et al. | 364/528.14 |
| 5,485,369 | 1/1996 | Nicholls et al. | 705/9 |

OTHER PUBLICATIONS

Taylor, David A., Object–Oriented Information Systems Planning and Implementation, John Wiley & Sons, Inc. (1992).

Raumbaugh, James et al., Object–Oriented Modeling and Design, Prentice–Hall, Inc., (1991).

Booch, Grady, Object–Oriented Analysis and Design with Applications, Benjamin/Cummings Publishing Company, Inc. (1994).

*Primary Examiner*—Emanuel Todd Voeltz
*Assistant Examiner*—William Brian Edge
*Attorney, Agent, or Firm*—Baker Botts L.L.P.

[57] ABSTRACT

The invention comprises a rating engine, system, and method for processing rating requests in a computerized rating system. One aspect of the invention is an object-oriented rating engine operable to receive a rating request associated with a carrier contract. The rating engine comprises a base rating engine object operable for use on a computer and further operable to calculate a linehaul rate in response to the rating request. The base rating engine object further comprises a rating method operable to calculate a linehaul rate and a rate data structure comprising at least one rate value. The rate data structure is accessible by the rating method for use in calculating a linehaul rate.

37 Claims, 5 Drawing Sheets

MODULAR RATING ENGINE, RATING SYSTEM AND METHOD FOR PROCESSING RATING REQUESTS IN A COMPUTERIZED RATING SYSTEM

CROSS-REFERENCE TO RELATED APPLICATIONS

This application is related to U.S. application Ser. No. 08/905,676 filed on Aug. 4, 1997, by Henrik Danford-Klein, et al. and entitled, "Object Oriented Rating System and Method."

This application is related to U.S. application Ser. No. 08/905,808 filed on Aug. 4, 1997, by Henrik Danford-Klein, et al. and entitled, "Qualification Engine, Rating System, and Method for Qualifying Rating Requests in a Computerized Rating System."

TECHNICAL FIELD OF THE INVENTION

This invention relates generally to computerized rating systems and more particularly, to a rating engine, system and method for processing rating requests in a computerized rating system.

BACKGROUND OF THE INVENTION

Members of the transportation industry contract with their customers to ship goods by truck, rail, ship, plane or other forms of transportation. Some transportation companies, such as Federal Express, may not have written contracts with small volume customers or individuals. On the other hand, Federal Express may have a written contract with special pricing and/or volume discounts for a larger customer, such as General Motors. Truckload carriers, such as Schneider National Carriers, Inc. often sign written contracts with customers that regularly ship large quantities of goods. These contracts will ordinarily specify whether a carrier will transport a load from one location to another, the conditions under which such transportation can occur, the price for such transportation, and the price for additional services associated with that particular shipment.

Accordingly, a particular contract between a carrier and a customer contains (1) qualifications that must be met for a shipment to occur pursuant to the contract, and (2) price terms for shipments that meet the qualifications for use of that contract. The term "contract" is meant to be broadly interpreted and may, but does not necessarily, refer to a single written contract between a carrier and a customer. A single written contract might contain several different sets of qualifications with a unique set of prices associated with each set of qualifications. A written contract between a carrier and a customer might contain multiple contracts as described here, or a contract may be the combination of multiple written contracts between the carrier and customer.

The qualifications associated with a particular contract limit the types of shipments allowed under the contract. Qualifications associated with a contract also specify the conditions under which particular prices for services provided pursuant to the contract apply. Examples of qualifications include, but are not limited to, equipment type, freight class, service type, weight, transportation mode, contract type, product class, product identification number, etc.

Contracts also include prices for services associated with shipments meeting the qualifications of the contract and provided pursuant to the contract. One type of service often provided pursuant to a particular contract is linehaul service. A linehaul rate comprises the price charged to move a particular shipment between two points. Contracts often include prices for services provided other than linehaul service. Examples of such services include hand unload, stopoffs, tarps, warehouse service, etc. A table of example services is provided below.

A particular carrier may have many contracts with a given customer. These contracts will typically have different qualifications associated with them. For example, a particular carrier may have separate contracts with a customer for each of the following types of services: flatbed service, truckload service, less than truckload service, truckrail service and refrigerated trailer service. A carrier and customer may also have multiple contracts for a particular type of service. For example, a carrier and customer may have different contracts for less than truckload service based upon the freight class of the goods being shipped. In addition, the prices charged various customers may vary depending upon the volume of business conducted. In summary, a customer may have many different contracts with a particular carrier and a particular carrier may have many contracts with different customers for the same or similar services.

Customers may also have multiple contracts with many different carriers. Customers shipping a large amount of goods may exceed the shipping capacity of even several carriers combined. Certain carriers may only ship goods within certain regions, necessitating contracts between a customer and multiple carriers. In addition, a customer may desire to have contracts with multiple carriers in order to induce greater price competition. The term contract is also meant to broadly refer to shipments pursuant to a tariff, circular, or other type document.

Because both customers and carriers may maintain a large number of contracts, management of these contracts presents additional difficulties. To simplify this management task, customers, carriers, and logistics companies have employed computer software to calculate the price for a given shipment and to generate orders, bills, checks, and electronic payment for the shipment. Customers holding contracts with multiple carriers may use such software to compare prices available for a particular shipment so that the customer pays the lowest price for the shipment. This function is normally referred to as best rate lookup.

Some existing systems capable of calculating the price of a given shipment (rating) employ relational databases to store the data necessary to calculate a price. Unfortunately, each contract may include a large amount of price data, date ranges for which the price data is valid, and qualifications specifying the conditions under which such prices are applicable. Due to the many possible qualifications and date restrictions, these relational databases contain a large number of keys used to search the database. Although such keys are not considered to be redundant data in a relational database, the reality is that data ends up being replicated many times for use as a key for searching the database.

The use of relational databases for performing rating has a number of disadvantages. The large amount of redundant data resulting from the large number of keys in the database causes a substantial increase in storage requirements. Because the database is large, access times to retrieve the relevant data are relatively slow. Locating the relevant data in the database can take an unreasonable amount of time compared to the needs of many businesses utilizing such software.

Relational databases cause performance problems as well. A substantial amount of time is wasted in such systems searching for price data that turns out to be unusable because the qualifications for use of the price data are not met. To determine that the price data is unusable, the data must still be located in the database. After locating the data, all of the relevant qualifications are matched against the rating request and if a particular condition is not met, then all of the time locating the relevant data has been wasted.

Performance problems are magnified when a customer or logistics company desires to perform optimization. Optimization requires the performance of even more calculation as the software must compute the price charged by multiple carriers for a particular shipment.

SUMMARY OF THE INVENTION

The present invention attains improved performance versus existing systems by employing modular rating engines to achieve a logical grouping of contract rating data used to calculate linehaul rates. One aspect of the invention is an object-oriented rating engine operable to receive rating requests associated with a carrier contract. The rating engine comprises a first base rating engine object operable for use on a computer and further operable to calculate a linehaul rate in response to the rating request. The base rating engine object further comprises a rating method operable to calculate a linehaul rate and a rate data structure comprising at least one rate value wherein the rate data structure is accessible by the rating method for use in calculating a linehaul rate.

The invention has several important technical advantages. The invention allows a modular approach to construction of rating engines that creates a flexible system from which a complex rating engine for a particular carrier contract may be created. This modular approach also allows new types of rating engines to be easily developed without affecting the function of existing rating engines. Because rate calculation for many different types of rates is similar, the use of modular rating engines allows the invention to take advantage of these similarities, making data entry easier, reducing data redundancy, and, in turn, reducing storage requirements. The use of modular rating engines also greatly increases the speed for calculating the cost of linehaul service in response to a rating request.

Another aspect of the invention is the grouping of rating data by effective dates. According to this aspect of the invention, rating data for a particular carrier contract may be grouped together such that the rating data contained in a particular rating engine object is valid only for a date range that applies to all data contained in the object. The grouping of rating data by effective date avoids the redundancy of storing date information at the lane level, thus lowering storage requirements and increasing calculation speed. The invention avoids unnecessary data location operations by determining quickly whether a particular rating engine has a date range applicable to the rating request.

BRIEF DESCRIPTION OF THE DRAWINGS

For a more complete understanding of the present invention and the advantages thereof, reference is now made to the following descriptions, taken in connection with the accompanying drawings, in which.

DETAILED DESCRIPTION OF THE INVENTION

The preferred embodiment of the present invention and its advantages are best understood by referring to FIGS. 1–8 of the drawings, like numerals being used for like and corresponding parts of the various drawings.

Figure 1:
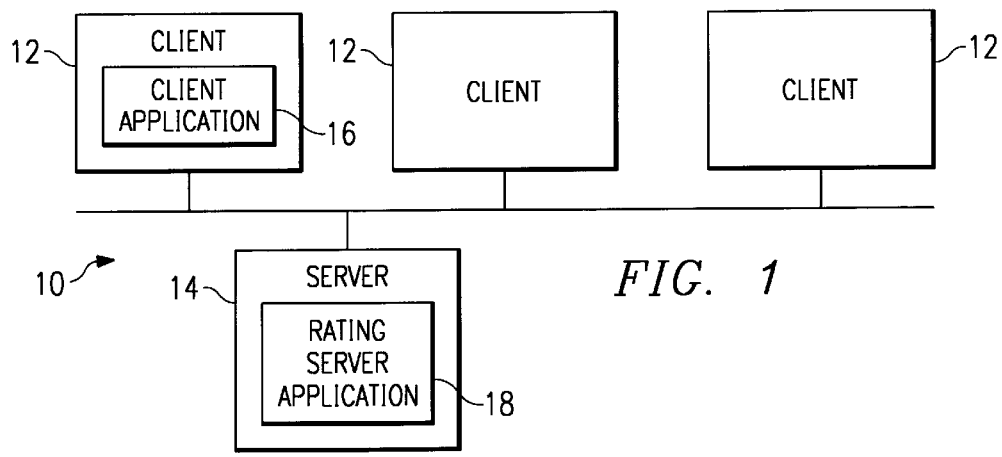
FIG. 1 illustrates an example of a computer network configuration that may be used for a computerized rating system constructed in accordance with the invention.

FIG. 1 illustrates a computer network 10 that may be used for a computerized rating system constructed in accordance with the teachings of the invention. Although the invention is shown in a client server environment, the invention can be used in any computer environment. Computer network 10 comprises one or more client computers 12 connected through a computer network to one or more computers 14.

In this example, one client computer 12 is running a client application 16 that may be used to perform a rating operation by accessing contract data associated with carrier contracts. Rating server application 18 is running on server computer 14 and is operable to receive rating requests from client application 16 through computer network 10. A user of client computer 12 that desires to determine the price for a particular shipment of goods, generate an order for such shipment, generate a bill for such shipment, and/or cause payment for such a shipment, uses client application 16 to generate such a request to rating server application 18. Rating server application 18 performs the necessary calculations and returns the results to client application 16.

Figure 2:
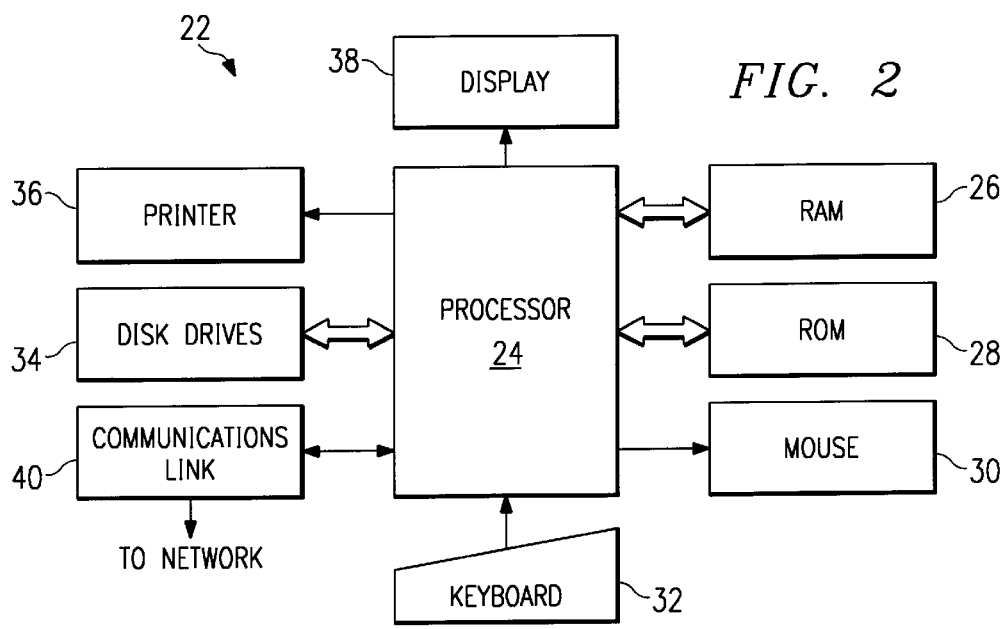
FIG. 2 illustrates a diagram of an exemplary general purpose computer that may be used in the network of FIG. 1.

FIG. 2 illustrates a general purpose computer 22 that may be used for client computer 12 and/or server computer 14 of FIG. 1. General purpose computer 22 may be used to execute applications comprising computerized rating systems constructed in accordance with the present invention. General purpose computer 22 may be adapted to execute any of the well-known MS-DOS, PC-DOS, OS2, UNIX, MAC-OS and WINDOWS operating systems or other operating systems. General purpose computer 22 comprises processor 24, random access memory (RAM) 26, read only memory (ROM) 28, mouse 30, keyboard 32 and input/output devices, such as printer 36, disk drives 34, display 38 and communications link 40. The present invention includes programs that may be stored in RAM 26, ROM 28 or disk drivers 34 and may be executed by processor 24. Communications link 40 is connected to computer network 10 but could be connected to a telephone line, an antenna, a gateway, or any other type of communication link. Disk drives 20 may include a variety of types of storage media such as, for example, floppy disk drives, hard disk drives, CD ROM drives, or magnetic tape drives. Although this embodiment employs a plurality of disk drives 34, a single disk drive 34 could be used without departing from the scope of the invention. FIG. 2 only provides one example of a computer that may be used with the invention. The invention could be used on computers other than general purpose computers, as well as on general purpose computers without conventional operating systems.

Figure 3:
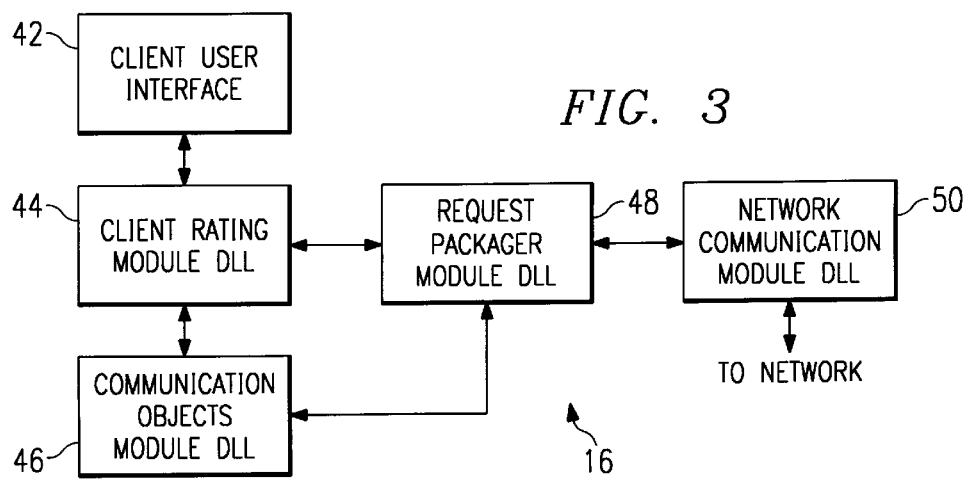
FIG. 3 illustrates a block diagram of a client that may be used in a computerized rating system constructed in accordance with the invention.

FIG. 3 illustrates a block diagram of an embodiment of client 16. Client 16 may be stored in RAM 26, ROM 28 or disk drives 34 of general purpose computer 22 or on a different computer. Client user interface 42 uses client 16, which comprises client rating module dynamic link library 44, communication objects module dynamic link library 46, request packager module dynamic link library 48, and network communication module dynamic link library 50. This embodiment of client 16 comprises a 32-bit version employing WINDOWS dynamic link libraries. Other embodiments of client 16 may include a 16-bit version implemented with WINDOWS dynamic link libraries and a UNIX version. The 16-bit WINDOWS version of the client application employs a THUNK conversion, such as is commonly performed in the WINDOWS operating system.

A client user interface 42 desiring to obtain rating information will make a request using client rating module dynamic link library 44. This request will result in procedure calls to client rating module dynamic link library 44. Client rating module dynamic link library 44 provides access to functions of the rating server 18. Client rating module dynamic link library 44 provides access to the same exported functions found in the rating module dynamic link library of rating server 18 which normally executes on server computer 14. By having the same exported functions for both the client rating module dynamic link library 44 and the rating module dynamic link library of the rating server 18, the dynamic link libraries may be used interchangeably. This means that if there is a need for a stand-alone version of the system, a user may obtain the rating module dynamic link library for rating server application 18 and substitute it for client rating module dynamic link library 44. In other words, a particular user may be given a personal copy of the rating information maintained by the rating module dynamic link library of rating server 18.

Returning to the operation of client 16, client rating module dynamic link library 44 will make appropriate calls to request packager module dynamic link library 48. Based upon the service requested, request packager module dynamic link library 48 will build a request object which contains an identifier for the function desired on rating server 18, the total amount of data to send, and any additional objects required as input parameters to the function on rating server 18. The request packager module dynamic link library 48 will then call a send-type function in the network communication module dynamic link library 50 and will wait for a result object to be returned.

Network communication module dynamic link library 50 will send the request packet and additional objects to server computer 14. After server computer 14 has completed processing the request, it sends the result back to network communication module dynamic link library 50, which returns it to the request packager module dynamic link library 48. When request packager module dynamic link library 48 receives the return data packet, it breaks it down into the appropriate objects and passes the data back to client rating module dynamic link library 48. Client rating module dynamic link library 44 returns the data and/or result to the calling function in client user interface 42. Communication objects module 46 may provide a common set of structures or classes for data passing. In other words, communication objects module dynamic link library 46 may provide a library of structures that may be used by client rating module dynamic link library 44 and/or request packager module dynamic link library 48 to pass data to server computer 14.

Figure 4:
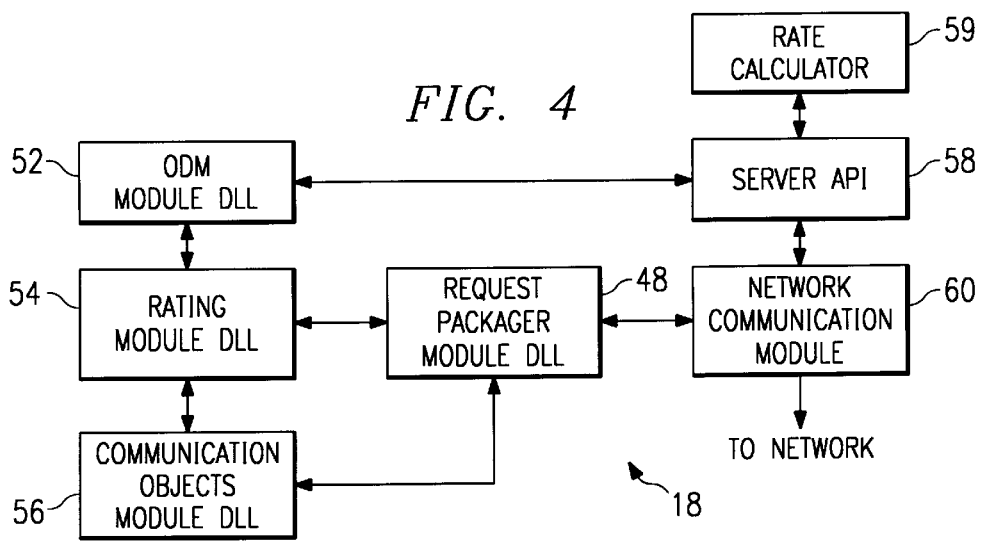
FIG. 4 illustrates a block diagram of a rating server that may be used in a computerized rating system constructed in accordance with the invention.

FIG. 4 illustrates a block diagram of an embodiment of rating server 18 constructed in accordance with the invention. Rating server 18 may be stored in RAM 26, ROM 28, or disk drives 34 of general purpose computer 22 or in another location. In addition, both client 16 and rating server 18 may be stored on the same computer. Rating server 18 comprises rating module dynamic link library 54, communication objects module dynamic link library 56, request packager module dynamic link library 48, server API 58, rate calculator 59, and network communication module 60. ODM module DLL 52 uses rating server 18 and may attain such access either through rating module DLL 54 or server API 58. Applications will preferably access rating server 18 using server API 58 unless it is incapable of using application program interfaces.

In operation, network communication module 60 receives a request packet from the network and passes the completed request packet to server API 58. Server API 58 generates the appropriate call to rate calculator 59, which comprises a dynamic link library. The results of the calculation are returned to the network by server API 58 and network communications module 60.

Alternatively, requests can be made through rating module DLL 54 in a manner similar to that described with respect to FIG. 3. In this embodiment, request packager module dynamic link library 48 is identical to its counterpart in client 16, but could be tailored to specific functions required by rating server 18. The same is true for communication objects module DLL 56 and network communication module DLL 60.

Server API 58 may be used to access rating services. It allows queries of statistical information, as well as control of rating calculator 59. Statistical information includes current connections, execution duration, and total connections. Server API 58 may unload and reload rating calculator 59, as well as reload specific rate information for a given rating calculator 59. Server API 58 uses the same request/result data formatting via network communication module 60 as used by clients to obtain rating information using rating module DLL 54. Accordingly, server API 58 may be run on any computer that has access to rate calculator 59 on server computer 14. Such access may include network access.

ODM module dynamic link library 52 comprises an optimization data manager application that may be used to perform optimization functions, such as identifying the least expensive carrier for a specific shipment of goods. ODM module dynamic link library 52 may directly access functions in server API 58 or indirectly through rating module dynamic link library 54.

Although examples of client 16 and rating server 18 have been provided, other embodiments could be used without departing from the scope of the invention. In addition, different embodiments may be created for different operating systems and/or environments. Finally, the teachings of the present invention may be used for a stand-alone application rather than an application used in a client server environment.

Figure 5:
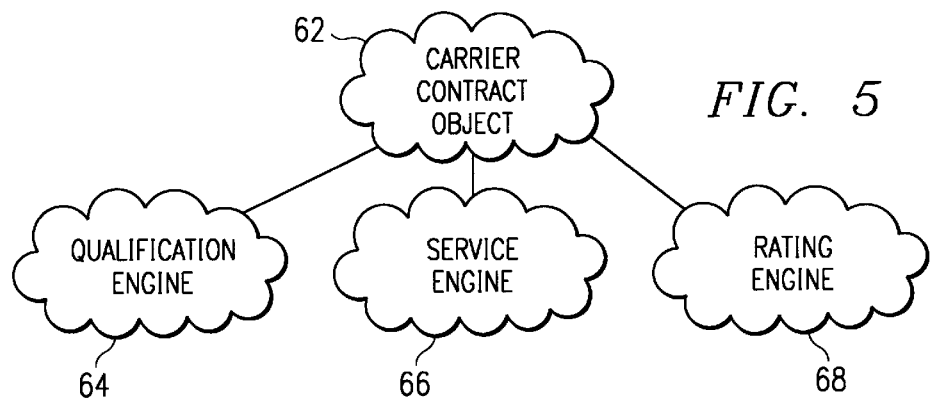
FIG. 5 illustrates a diagram of a portion of a computerized rating system constructed in accordance with the invention.

FIG. 5 illustrates an architectural diagram of a portion of rate calculator 59 in rating server 18. In a computerized rating system constructed in accordance with the invention, data is organized based upon carrier contracts. Each carrier contract is associated with at least one carrier contract object 62. Thus, at least a portion of a computerized rating system constructed in accordance with the teachings of the invention is object-oriented. As shown in FIG. 5, a particular carrier contract object 62 may access a qualification engine 64, service engine 66, and/or rating engine 68.

The functions performed by qualification engine 64, service engine 66, and rating engine 68 are best understood by examining the operation of these engines in calculating the price for a particular shipment. Although the function will be described in more detail below, a brief overview is now provided. Carrier contract object 62 is operable to receive a rating request containing a collection of data parameters specifying all of the information needed to calculate the price of a particular shipment of goods from one point to another, including all services associated with that request. Carrier contract object 62 first uses qualification engine 64 to determine whether the carrier contract represented by carrier contract object 62 is qualified based upon the conditions specified in the rating request. If carrier contract object 62 is not qualified to process the rating request, then a rate not found message is returned in response to the rating request. If the carrier contract is qualified to process the rating request, then it determines the price for the shipment identified in the rating request using service engine 66 and rating engine 68.

Rating engine 68 calculates the linehaul rate corresponding to the rating request. Service engine 66 may be used to calculate the price of all other relevant services that are called for by a rating request. There are many different types of services that may be provided pursuant to a rating request. Examples of such services are included below in Table 1.

The cost of linehaul service is calculated by this embodiment of rating engine 68, while the cost of other services are calculated by service engine 66. In an alternative invention (not explicitly shown), the cost of linehaul service could be calculated by service engine 66. In such an alternative embodiment, the functions of rating engine 68 would be incorporated into service engine 66. Thus, the cost of linehaul service may be treated as just one type of service that may be called for by a rating request. Depending upon the design of service engine 66, it may be desirable to have a separate rating engine 68 to calculate the cost of linehaul service.

In this embodiment, qualification engine 64 comprises one or more software objects. An exemplary embodiment of qualification engine 64 will be discussed below in connection with FIGS. 6 and 7. In this example, qualification engine 64 comprises an instance of a qualification engine object class and is contained in carrier contract object 62.

The use of qualification engine 64 facilitates grouping of rating data by qualifications. Grouping of data by qualifications results in faster access to rating data, as well as a large reduction in redundant data compared to existing systems. Qualifications limit the types of shipments that rating data applies to. As noted above, carriers often have multiple contracts with a particular customer where each contract has different qualifications. In this embodiment, the qualifications associated with a particular contract may include, but are not limited to, equipment type, freight class, contract type, transportation mode, weight value, service level, stop value, bill-to code, quote number, and/or equipment owner identification. Transportation mode refers to various different types of transportation such as rail, small package, less than truckload, truckload, truck rail, refrigerated, etc. Contract type refers to various types of contracts such as base, continuous move, round trip, dedicated, and/or expedite. Product class may generally refer to classes of products such as frozen, refrigerated, heated, or dry.

Qualification engine 64 has access to a plurality of sets of qualifications. Each qualification set includes one or more qualifications applying to a particular class of contracts. The invention takes advantage of the fact that many participants in the transportation industry use contracts with identical qualifications for identical types of services. For example, many carriers that provide refrigerated trailer service may have the same qualifications associated with their contracts for refrigerated service. Similarly, many truck rail equipment carriers may have identical qualifications for their truck rail service contracts with customers. By taking advantage of similarities in qualifications, the invention reduces the amount of data redundancy, as a single set of qualification data need only be stored once and can be used with many contracts. The qualification engine 64 is also flexible enough to handle special contracts that may only apply to a single contract between a single carrier and a single customer. In such a case, a special qualification set is created for that carrier contract and can be accessed by qualification engine 64. The invention thus takes advantage of similarities in qualifications between contracts, but remains flexible enough to handle special cases.

Qualification types fall into two major categories: matching and bounds. The first type, matching qualifications, comprise a qualification type and a value. Matching qualifications are generally used where a qualification parameter sent with a rating request has to match a member of a qualification set exactly. For example, equipment type will normally be a matching type qualification. A rating request for a van trailer would normally specify a 45-foot, a 48-foot, or a 53-foot van trailer. To be qualified, the carrier contract would have to be associated with a qualification set that includes a van trailer of 45 feet, 48 feet, or 53 feet.

The other category of qualification types is bounds qualifications. Bounds qualifications normally comprise a qualification type, a bound operand, and a value. To determine whether a particular qualification parameter supplied with a rating request meets a bounds-type qualification contained in the qualification set, the value of the qualification parameter is compared with the value of the qualification stored in the qualification set using the bound operand. For example, load weight may be a bounds-type qualification. A particular carrier may desire not to carry any load over 50 tons. In such a case, a qualification in the qualification set may be that load weight is less than 50 tons. In this example, the qualification type is load weight, the bound operand is less than, and the value is 50 tons. In processing a rating request, qualification engine 64 would compare the load weight provided with the rating request and determine whether it was less than 50 tons. If so, then the qualification engine 64 would determine that the carrier contract was qualified for the shipment corresponding to the rating request, assuming that all other qualifications were met.

In summary, a qualification request may include a qualification parameter comprising a parameter type and a parameter value. To determine whether this qualification parameter meets a bounds type qualification in a qualification set, qualification engine 64 compares the qualification parameter to the bounds qualification requirement, wherein the qualification type of the bounds type qualification requirement matches the qualification parameter's parameter type and the qualification engine compares the parameter value to the bounds type qualification value using the bound operand. If the parameter value is within the bounds set by the bound operand and qualification value, then a true result is produced in response to the comparison.

Qualification engine 64 implements matching-type qualifications by using an equality operator between the qualification type and qualification value in the qualification set. In a sense, then, all qualifications can be implemented as bounds-type qualifications in this embodiment of the invention. Qualification sets could be implemented differently, however, without departing from the scope of the invention.

The equipment type qualification cited in the example above could be implemented as a bounds type qualification. In this embodiment of qualification engine 64, each equipment type is assigned a numerical equipment ID. If a particular qualification set included equipment types 10–15, then the qualification set could include a range-type bounds operand where the equipment ID range is between 10 and 15. This example also illustrates that a bounds type qualification might have multiple bounds values associated with it, particularly when a range operand is employed.

To determine whether a carrier contract is qualified to process a particular rating request, carrier contract object 62 generates a qualification request to qualification engine 64. Qualification engine 64 then determines whether the set of qualification parameters passed with the qualification request is a subset of the qualification set associated with the carrier contract represented by carrier contract object 62.

For example, suppose that a standard flatbed contract has the following qualification set: equipment type equals 48 foot flatbed trailer, equipment type equals 45 foot flatbed trailer, equipment type equals 48 foot flatbed sliding tandem, and weight is less than fifty tons. Suppose that the qualification request to qualification engine 64 contains the following parameters from a rating request sent to carrier contract object 62: equipment type equals 45 foot flatbed trailer, and weight equals thirty tons. In this example, qualification engine 64 would determine that the contract is qualified to handle this request. The two member set of qualification parameters is a subset of the four member qualification set, taking into account bounds operands. The equipment type parameter appears in the qualification set and the weight parameter satisfies the condition imposed by the bounds type weight qualification in the qualification set. If, on the other hand, the qualification parameter for equipment type was for a fifty-three foot van trailer, then qualification engine 64 would have returned a negative response to the qualification request indicating that the carrier contract associated with carrier contract object 62 was not qualified for the shipment requested pursuant to the rating request.

As noted, this embodiment of qualification engine 64 comprises an object contained in carrier contract object 62. Qualification engine 64 further comprises a qualifying method operable to compare the qualification parameters provided with a qualification request to a set of qualification requirements to determine whether the carrier contract is qualified.

If qualification engine 64 determines that carrier contract object 62 is qualified to handle a particular rating request, then carrier contract object 62 will determine the linehaul rate using rating engine 68. Rating engine 68 comprises one or more instances of a collection of rating engine object classes. Accordingly, rating engine 68 may be comprised of one or a plurality of software objects. The structure and operation of rating engine 68 will be more fully described in connection with FIG. 6 below. In this embodiment, rating engine 68 comprises an object or objects contained in carrier contract object 62 and may also include one or more objects used by carrier contract object 62.

After calculating a linehaul rate using rating engine 68, carrier contract object 62 will use service engine 66 to calculate the price for various additional services that may be included in the rating request. Similar to rating engine 68, service engine 66 comprises one or more software objects contained in carrier contract object 62 and may contain one or more objects used by carrier contract object 62. Again, the structure of service engine 66 will be described more fully in connection with FIG. 6 below.

Although the structure illustrated in FIG. 5 provides one embodiment of a rating system constructed in accordance with the invention, various substitutions may be made without departing from the scope of the invention. For example, although qualification engine 64, service engine 66, and rating engine 68 each include one or more objects contained in carrier contract object 62, these objects might only be used by carrier contract object 62 and not contained therein. In addition, rather than implementing these engines as separate objects, any one or more of these engines could be implemented as methods of carrier contract object 62. These engines could also be implemented as software modules accessible through ordinary procedure calls from carrier contract object 62.

Although a number of qualification types have been listed, more or less qualification types could be used without departing from the scope of the invention. A particular qualification set may include one or more of the qualification types and need not include a qualification of every type. Other categories of qualifications other than matching or bounds qualifications could also be used.

Figure 6A:
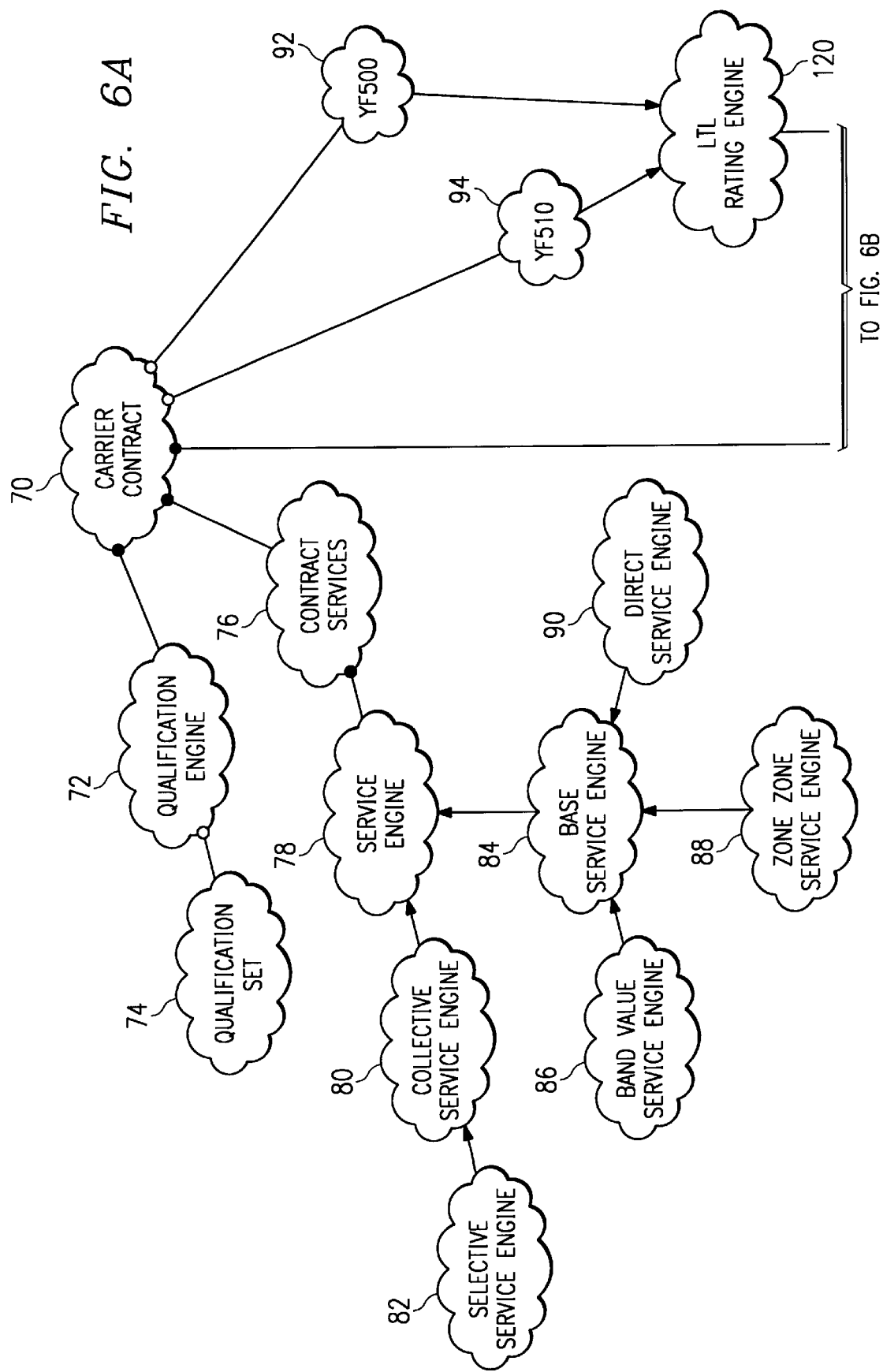
FIG. 6 illustrates an object class diagram comprising a portion of one embodiment of a computerized rating system constructed in accordance with the invention.
Figure 6B:
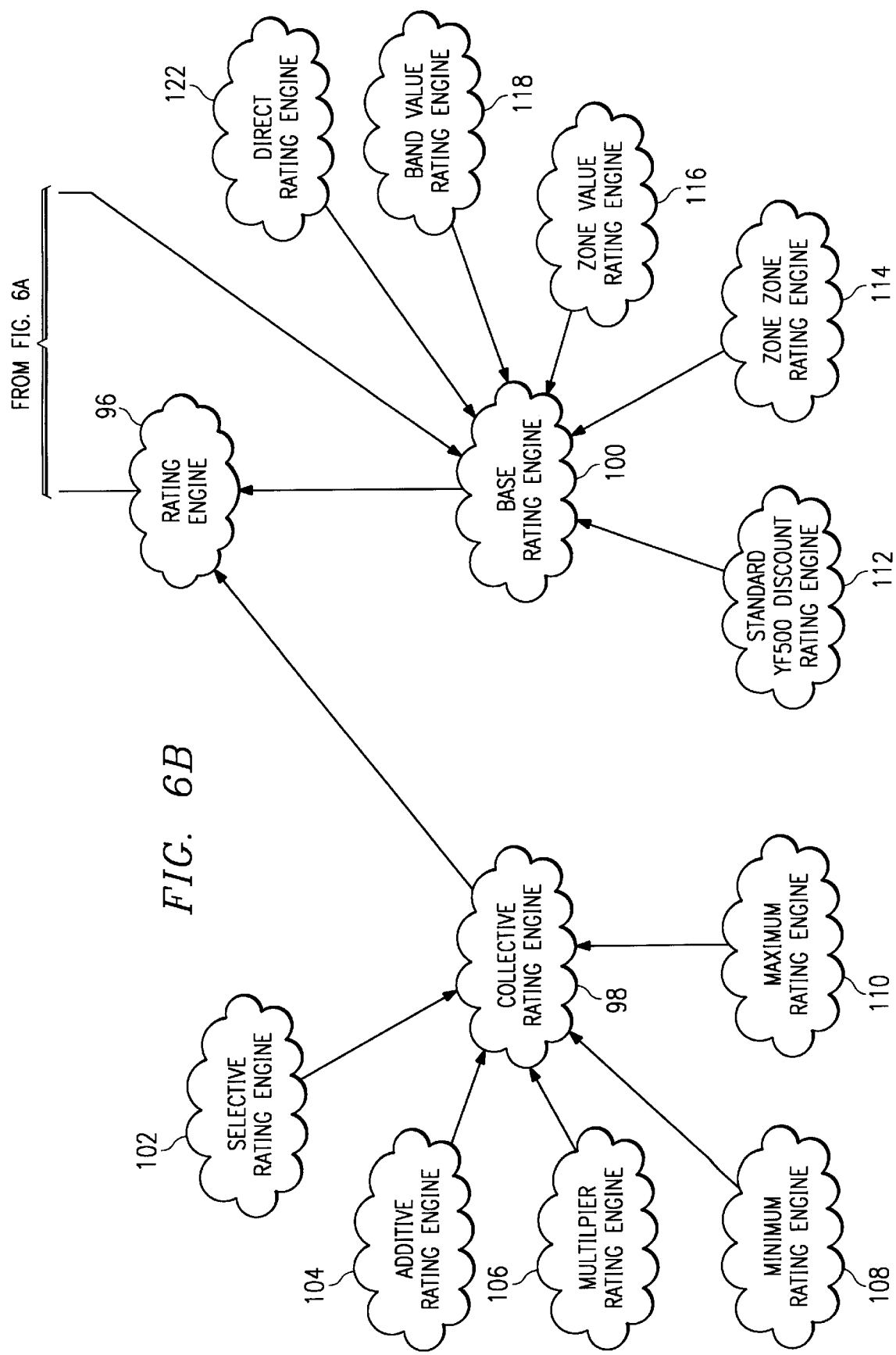

FIG. 6 illustrates a class diagram of a portion of an exemplary computerized rating system constructed in accordance with the invention. In this embodiment, instances of the object classes illustrated in FIG. 6 will form a portion of rating server application 18. FIG. 6 illustrates the object classes that may be used to represent a particular carrier contract. As is commonly done in object class diagrams, an arrow on the line joining two object classes indicates inheritance, an open circle indicates that an object is used by another object, while a closed circle indicates that an object is contained in another object.

In this embodiment, qualification engine object class 72 defines the object class for a qualification engine. An instance of qualification engine object class 72 is contained in carrier contract object class 70. Carrier contract object class 70 contains information about a specific carrier contract. Here, each carrier and each customer are assigned an identification number. Those numbers are stored in instances of carrier contract object class 70. Carrier contract object class 70 contains a contract type identification and transportation mode identification. An instance of carrier contract object class 70 also contains qualifications, rates and services which are implemented as a plurality of instances of the object classes illustrates in FIG. 6. These objects are contained in the instance of carrier contract object class 70. Carrier contract object class 70 also contains methods used for rating a request using the qualifications, rates and services.

Qualification engine object class 72 comprises an object class. Each instance of carrier contract object class 70 also contains an instance of qualification engine object class 72. Qualification set object class 74 is an object class containing each of the qualification sets that may be used to qualify a particular rating request. In this embodiment, only one instance of qualification set 74 is used. Each instance of qualification engine object class 72 uses the single instance of qualification set object class 74 for qualifying a rating request.

Certain qualifications may be considered so general that a method contained in carrier contract object class 70 is used to partially qualify a rating request. In such a circumstance, an instance of carrier contract object class 70 would store at least a subset of the qualifications associated with that carrier contract. For example, in this embodiment, the contract type and transportation mode qualifications are implemented by placing those qualifications directly in carrier contract object class 70. These qualifications could be placed in one of the qualification sets stored in qualification set object class 74. Contract types include but are not limited to one way moves, continuous moves, round-trip moves and dedicated moves. Transportation modes include but are not limited to truckload/van, less than truckload, rail, air, truckload/flatbed, truckload/bulk, vessel, small package and truck/rail. Although these transportation modes may not be considered to be such in the strictest sense, they may provide convenient categorizations for a computerized rating system.

An instance of carrier contract object class 70 contains a qualification set identification that allows the qualification engine to determine which qualification set in the instance of the qualification set object class 74, to use for qualifying a particular rating request. This instance variable could also be stored in an instance of qualification engine object class 72.

Qualification engine object class 72 comprises a method operable to compare qualification parameters associated with a rating request to a qualification set to determine whether the carrier contract is qualified to handle a particular rating request. The sets of qualification requirements are stored in qualification set object class 74. The data structure containing the qualification sets is implemented as a list of lists. Each item in the primary list is a qualification set while each item in a qualification set comprises a matching or bounds type qualification. In this embodiment, each element of a qualification set comprises a qualification ID, a bound operand and one or more bound values. Other data structures could be used to store the qualification sets without departing from the scope of the invention.

This embodiment requires certain qualification parameters to be present in any rating request. The contract type, transportation mode, equipment type, and commodity type are all required parameters. These qualification types may or may not be utilized by an instance of qualification engine object class 72 to qualify a given rating request but are required to be in that request in case they are needed to qualify the request. The commodity may be identified by the freight class, product class or product identification number. More or less qualifications may be required to be included in a rating request without departing from the scope of the invention.

Other qualifications may include weight, service level, stop/activity type, bill-to code, quote number, equipment ownership, terms and volume number. The volume number would be used for contracts applying to special volume discounts. Again, other qualifications could be used or some of these qualifications not used without departing from the scope of the invention. The operation of instances of qualification engine object class 72 is described above with respect to qualification engine 64 illustrated in FIG. 5. Qualification engine 72 accesses a particular qualification set using messages sent to the single instance of qualification set object class 74.

Although one embodiment of object classes that may be used to create a qualification engine have been illustrated in FIG. 6, other embodiments may be used without departing from the scope of the invention. For example, although an instance of qualification engine object class 72 is contained in an instance of carrier contract object class 70, that object could be used by a carrier contract object. The qualification engine object could be contained in another object associated with a carrier contract object. The term "associated" is used broadly and includes, for example, objects used by the carrier contract object and/or objects contained in the carrier contract object. Also, the qualification engine could be implemented as methods of the carrier contract object rather than as a separate object. The qualification engine could even be a collection of procedures not implemented in an object-oriented fashion, but accessible by a carrier contract object. Although this implementation uses an instance of qualification engine object class 72 for each carrier contract object, a single instance of qualification object class 72 could be shared among multiple carrier contract objects in a slightly different implementation of the invention.

Similarly, although the qualification set information is stored in a single instance of qualification set object class 74, the qualification set associated with a particular carrier contract could be stored as an instance variable in an instance of carrier contract object class 70 or qualification engine object class 72. In addition, an instance of qualification set object class 74 could be contained in each instance of qualification engine object class 72 rather than used by such an instance. Multiple instances of qualification set object class 74 could also be created such that each qualification set comprised a separate instance of the object class. Any of these options and other options can be used without departing from the scope of the invention.

Turning to object classes relating to the rating engine function, the following object classes illustrated in FIG. 6 may be used to create rating engine 68 of FIG. 5: rating engine object class 96, collective rating engine object class 98, base rating engine object class 100, selective rating engine object class 102, additive rating engine object class 104, multiplier rating engine object class 106, minimum rating engine object class 108, maximum rating engine object class 110, standard YF 500 discount rating engine object class 112, zone zone rating engine object class 114, zone value rating engine object class 116, band value rating engine object class 118, LTL rating engine object class 120, direct rating engine object class 122, YF 500 object class 92, and YF 510 object class 94. Because of the modular architecture of this embodiment of the invention, an actual rating engine comprises instances of one or more of these objects contained in an instance of carrier contract object class 70, Exceptions to this rule are instances of YF 500 object class 92 and YF 510 object class 94. Only a single instance of these objects exists in this embodiment of the invention and these objects may be used by an instance of carrier contract object class 70 and/or LTL rating engine object class 120. Other types of standalone rating engine object classes such as YF 500 object class 94 could be included and links maintained to carrier contract object class 70 without departing from the scope of the invention. Such engines may be preferable where rating data is consistent for many contracts.

Rating engines are designed to process different rate structures which include geography matrices, mileage bands, weight bands and complex combinations of these matrices and bands. These base rating engines contain the actual price data used to calculate the price for linehaul service. The price data is made up of an index type, origin/destination type or band type, a unit of measure, and effective dates. In addition to these specific base rating engines, there are rating engines which are collections of rating engines. Such rating engines are known as collective rating engines and include the selective, additive, multiplier, minimum, and maximum engines. Collective rating engines do not contain actual price data but instead contain other rating engines which could be base rating engines, as well as other collective rating engines. Collective rating engines also include the methods for uniquely processing the associated collection of rating engines.

Each rating engine associated with an instance of carrier contract object class 70 will be of a specific engine type, unit of measure code, effective start date, and effective end date. Other characteristics may be included, or some of these characteristics may be omitted from the rating engine without departing from the scope of the invention. As will be described more fully below, a rating engine may turn out to be a tree of instances of rating engine objects. In order to represent this hierarchy, each rating engine maintains a field noting its parent and a field noting its priority. Priority will also be discussed below.

The modular approach to constructing rating engines creates a flexible system from which a complex rating engine for a particular instance of carrier contract object class 70 may be created The modular approach also allows new types of rating engines to be easily developed without affecting the function of existing rating engines. Modularity also greatly increases the speed for calculating the cost of linehaul service in response to a rating request. Because rate calculation for many different types of rates is similar, the use of modular rating engines allows a computerized rating system constructed in accordance with the invention to take advantage of these similarities, making data entry easier, reducing data redundancy and, in turn, reducing storage requirements and allowing rating information to be loaded directly into memory of server computer 14.

In the embodiment illustrated in FIG. 6, all specific base rating engines and specific collective rating engines inherit from either collective rating engine object class 98 or base rating engine object class 100 and, in turn, from rating engine object class 96. Therefore, these engines are all descendants of some basic type of engine and have specific attributes and methods which facilitate the effective decomposition of a very complex data model.

Before discussing more details of how a rating engine is constructed using the noted object classes, the function of various specific base and collective rating engines will now be discussed. Zone value rating engine object class 116 is designed to support a geography structure for assigning a price to an origin zone or a destination zone. Such a base rating engine will be useful to implement an engine for calculating destination fees for calculating continuous move costs. This rating engine is designed to return a price value based upon a geographic zone.

An instance of zone zone rating engine object class 114 will support geography structures for determining the price of an origin/destination-type charge. The rate structure for a particular carrier contract can be as simple as a state-to-state matrix or can also have an override matrix for Zip 3 to Zip 3 within it. These types of matrices may be implemented using a zone to zone rating engine. An origin or destination may be specified by its five-digit zip code (Zip 5), three-digit zip code (Zip 3), standard point location code (SPLC), state and/or country. Accordingly, an instance of zone zone rating engine object class 114 may be used to calculate origin/destination linehaul service charges for a shipment between the following origin/destination combinations: Zip 5 to Zip 5, SPLC to SPLC, SPLC to Zip 3, SPLC to State, Zip 3 to SPLC, Zip 3 to Zip 3, Zip 3 to State, State to SPLC, State to Zip 3, Zip 3 Range to Zip 3 Range (open ranges), State to State, and Country to Country. Other origin/destination combinations could be implemented using zone zone rating engine object class 114 without departing from the scope of the invention.

Band value rating engine object class 118 may be used to implement a rating engine that maps a price to a band of values for a specific unit of measure. Accordingly, this object class may be used to implement weight band and mileage band rate structures.

Direct rating engine 122 may be used to implement an engine to calculate a price for a contract that contains just one price structure which includes the price and minimum charge. This type of rating engine is useful to implement charges for services with a flat rate. For example, Federal Express may have a flat rate for shipping a product with a certain class of service in the United States.

YF 500 object class 92 and YF 510 object class 94 are used to calculate the Yellow 500 less than truckload tariff and Yellow 510 less than truckload tariff, respectively. Because of the large amount of data involved for these two tariffs, a computerized rating system implemented in accordance with this embodiment of the invention, will only have a single instance of these two object classes that will be used by an instance of LTL rating engine object class 120 and/or an instance of carrier contract object class 70.

Standard YF 500 discount rating engine object class 112 is used to implement an engine to calculate a discount to apply to the Yellow 500 tariff. This engine will be based on a standard discount tariff for Yellow 500. It will comprise an origin discount based upon a Zip 3 origin, a destination discount based on a Zip 3 origin, a global discount, and a service area defined by Zip 3 ranges. The logic of an instance of standard YF 500 discount rating engine object class 112 will verify that the origin or destination of the request are both in the service area vector and will stop if they are not. The object will then look up an origin discount in the origin discount vector. If an origin discount is found, then that discount will be returned; otherwise, the object will continue. If an origin discount was not returned, then the object will search for a destination discount and the destination discount vector and return one, if found. If no origin or destination discount was found, the object will return the global discount.

Figure 8:
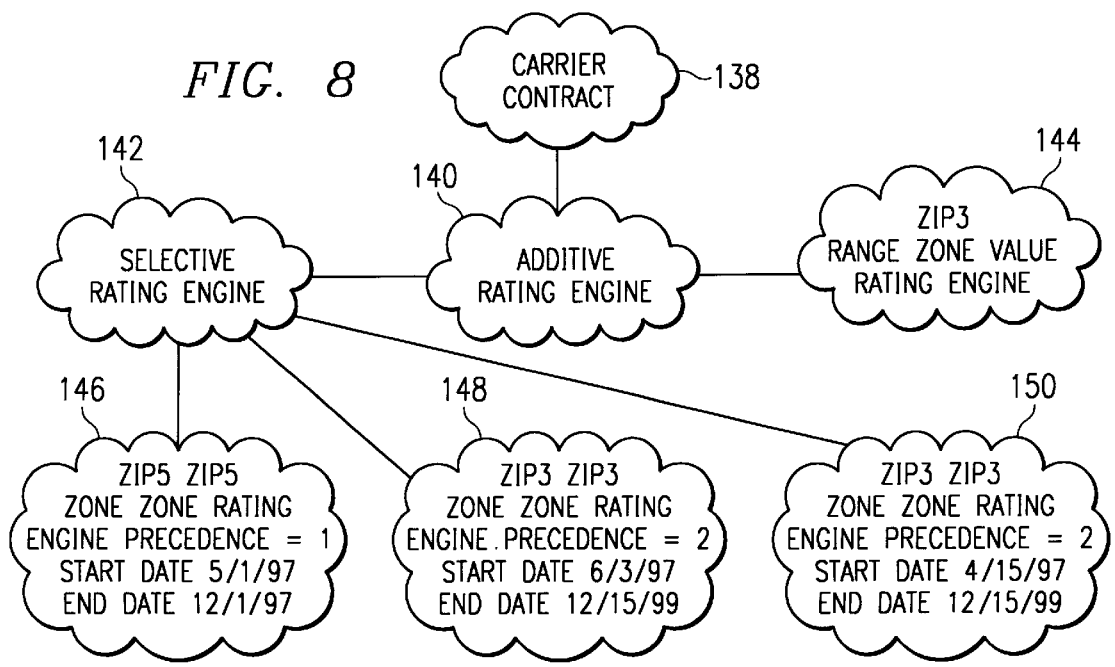
FIG. 8 illustrates an object diagram of a portion of a computerized rating system constructed in accordance with the invention.

Turning now to the function of specific collective rating engines, a general description of a collective rating engine may prove helpful. An exemplary collective rating engine contains a list of rating engines and a method to rate a request against the list. In some collective rating engines, this list is an ordered list organized primarily by a priority value, and secondarily by the effective start date assigned to the rating engine. Each collective rating engine is operable to perform an operation on linehaul rates calculated by rating engines on the list of rating engines maintained by the collective rating engine. Note that the list of rating engines that the collective rating engine operates on can include both base rating engines and collective rating engines. FIG. 8 illustrates an example of the use of collective rating engines.

The use of collective rating engines results in a tree-like structure where each node in the tree comprises either a base rating engine or a collective rating engine. Each leaf node of the tree comprises a base rating engine object, while each non-leaf node of the tree will comprise a collective rating engine object. The term "leaf node" refers to a node of the tree that has a parent node, but no children nodes associated with it. Note that the resulting tree frequently is not binary, as a collective rating engine may operate on more than two rating engines.

The function of the various collective rating engines will now be described. An instance of selective rating engine object class 102 will loop through its vector of rating engines and will stop when a rating engine finds a rate. Note that the term "rate" is used broadly to mean calculating a price, a multiplier to be applied to a price, or some other numerical or boolean value for a particular service. Although the rating engine will calculate a rate for linehaul service, each of the individual base and collective rating engines making up the overall rating engine may compute intermediate results that may also be referred to as rates. Accordingly, the term "rate" may refer to a particular parameter used to calculate the overall price for a shipment of goods. A rate may not always be determinable by a particular base rating engine or collective rating engine. Instead, a rate not found message may be returned by a particular base rating engine or collective rating engine. Thus, an instance of selective rating engine object class 102 will attempt to obtain a rate by looping through its ordered vector of rating engines and will stop when one of those rating engines returns a rate rather than a rate not found message.

The ordered vector utilized by selective rating engine 102 is ordered primarily by a priority assigned to each rating engine in the list, and secondarily according to a start date value assigned to each rating engine in the list. A priority code is maintained as an instance variable by each base or collective rating engine. This priority code is used to create an ordered list of rating engines operated on by a particular collective rating engine. This type of priority could be implemented in other ways, such as merely by ordering the objects when creating instances of the rating engines or by assigning priority based upon the type of rating engine. Any of these methods could be used without departing from the scope of the invention.

Another feature of the present invention that allows fast and efficient calculation of linehaul service rates is the grouping of rating data by the dates on which that data is effective. According to this feature of the invention, a rating engine specifies a start date and an end date for which the rating data associated with that object is valid. If the ship date does not fall within the date range, then that rating engine will return a rate not found message in response to a request to calculate a rate. In this embodiment, the secondary prioritization of the list of rating engines in a collective rating engine is performed in inverse order by start date. Accordingly, rating engines with equal priority codes having start dates that are later in time have a higher priority than rating engines with start dates that are earlier in time. Grouping of rate data according to effective dates allows the data to be located quickly, and also avoids replication of data. Because there may be a large number of items of rating data that have identical start and end dates, creating a rating engine containing rates with the same start date and end date avoids the need to store a start date and end date with each item of rating data.

In this embodiment, a new rating engine having a different date range is created even if a particular table containing 1,000 different rates incurs only a few changes due to typographical errors discovered by the carrier. The invention still results in lower storage requirements and faster processing times because if rating data was not grouped by effective dates, then a more complicated representation of rates at a lower level would significantly increase the size of rate data tables. In addition, if date information is stored at a lower level, substantial additional processing is required to determine whether the date fell within the date range applicable to a particular rating data item. The invention obtains a performance benefit, both by facilitating the loading of rate tables in memory rather than storage on a disk, as well as by not having to search through a limited set of date ranges before obtaining an individual rate data item at the lane level. FIG. 8 will be used to illustrate how the start date and end date associated with a rating engine affects the operation of the overall rating engine.

An instance of additive rating engine object class 104 will loop through its vector of rating engines and will add the results calculated by those rating engines together. For example, a continuous move operation would use this rating engine to add the results from a zone zone type engine with the results of a destination fee calculated by a zone value-type engine.

An instance of multiplier rating engine object class 106 will loop through its vector of rating engines and will multiply all of the results together. Less than truckload rating engines may use this type of engine to multiply the cost of the less than truckload rate by the carrier's discount. The carrier's discount will normally be calculated using a base rating engine such as an instance of standard YF 500 discount rating engine object class 112. The value of the discount is normally expressed as a percentage of the actual rate. Accordingly, the "rate" produced by an instance of standard YF 500 discount rating engine will not comprise an actual price, but will instead comprise a percentage value reflecting the proper discount. Accordingly, rating engines do not always calculate price parameters, but instead may calculate other parameters associated with a rating request. The term "rate" is meant to broadly encompass these parameters.

An instance of maximum rating engine object class 110 and an instance of minimum rating engine object class 108 loop through their vector of rating engines and will return the highest cost rate and the lowest cost rate, respectively, determined by each engine in their vector of rating engines.

Note that rating engine object class 96 is an abstract class. It is used to define a common interface to all base and collective rating engines.

An example of a rating engine associated with an instance of carrier contract object class 70 will be discussed in connection with FIG. 8 below. For present purposes, it is sufficient to note that the rating engine associated with a particular instance of a carrier contract object class may comprise a base rating engine, and/or a collective rating engine in combination with one or more additional base rating engines. Each of these rating engines is operable to calculate a linehaul rate in response to a rating request issued to the instance of carrier contract object class 70. Again, the term "linehaul rate" is used broadly with rate having the broad meaning discussed above. Although the final result calculated by the rating engine will normally be the price for linehaul service, a linehaul rate calculated by a particular base rating engine or collective rating engine may only be some other type of parameter used to determine the final linehaul price.

Each base rating engine object and collective rating engine object has a method operable to calculate a linehaul rate and a rate data structure comprising at least one rate value and accessible by the rating method for use in calculating a linehaul rate. In this embodiment, each of the individual rating engine objects are contained in an instance of carrier contract object class 70. The modular rating engine structure may be implemented in a different way without departing from the scope and teachings of the invention. For example, rating engines could be used by, rather than contained in, a carrier contract object. In addition, rating engines could be implemented as methods of the carrier contract object class. Also, a rating engine could be implemented as an ordinary software module containing a collection of procedures and variables. The functions of the collective rating engines could be implemented as methods of a carrier contract object that have access to base rating engine objects contained in or used by the carrier contract object. It should also be noted that a carrier contract object is broadly defined to comprise a collection of data representing contract terms of a contract between a carrier and a customer. Carrier contracts could be implemented in a different format such that each carrier contract is not represented by its own carrier contract object.

Although the invention includes the base and collective rating engines described above, other base rating engines and/or collective rating engines could be used in a computerized rating system without departing from the scope of the invention. One or more of the collective rating engines and/or base rating engines could also be omitted from a computerized rating system without departing from the scope of the invention.

In addition to the charges for basic linehaul service, contracts between a carrier and a customer may include charges for a large number of additional services that may be applicable to that particular contract. These charges could be flat charges, charges billed by the mile, charges by the hour, charges by the day, or charges by some other unit. Service charges include, but are not limited to, charges for tarps, night delivery, or rigging, to name just a few. Also, for certain types of shipments, equipment may be rented on a per-mile basis by the customer. Such a service would be described by the equipment type. Table 1 lists a series of services that can be handled by an embodiment of a computerized rating system constructed in accordance with the invention. Table 1 also indicates the unit of measure associated with a particular type of service. "FLT" refers to a flat rate unit of measure. "DAY" refers to a charge by the day. "HRS" refers to charges by the hour. "MI" refers to charges by the mile. "LBS" refers to charges by the pound. "UNT" refers to charges by the unit. "WD" refers to charges by per one hundred pounds of weight.

TABLE 1

| Service Description | Unit of Measure | Service Description | Unit of Measure |
|---|---|---|---|
| Second-Day Service | LBS | Advancing Charge | FLT |
| Advanced Equipment | FLT | Air-Ride Tractor | FLT |
| Auto Store Stop | FLT | Backhaul | MI |
| Bobtail Mileage | MI | Carrier-Owned Trailer | FLT |
| Canadian Bx Stop-off | UNT | Customer Equipment Return | FLT |
| Cheps Loads | UNT | Continuous Move Adjustment | FLT |
| Continuous Move Charge | FLT | Consolidation Charge | FLT |
| Contract Payable | FLT | C.O.D. | FLT |
| Canadian Prov. Tax | FLT | Crane Charge | FLT |

TABLE 1-continued

| Service Description | Unit of Measure | Service Description | Unit of Measure |
|---|---|---|---|
| Customer Notification | FLT | Constant Surveillance | FLT |
| Cartage Delivery | FLT | Customs Fee | FLT |
| Certified Weight Tickets | FLT | Commodity Check | FLT |
| Assist Load | LBS | Assist Unload | FLT |
| Doubles Charge | FLT | Dock Work | HRS |
| Dual Driver Protection Service | FLT | GM Dedicated Delivery | FLT |
| Decontainerize | FLT | Detention, Driver | HRS |
| Detention, Intransit | DAY | Detention, Rail Trailer | DAY |
| Detention, Trailer | DAY | Devanning | FLT |
| Deficit Miles | FLT | Dedicated Hourly Charge | HRS |
| Hand Load | FLT | Deadhead Mileage | MI |
| Hand Unload | FLT | Diversion | FLT |
| Delivery Charge | FLT | Dispatch of Equipment | MI |
| Driver Charge | UNT | Dropdeck Trailer | FLT |
| Direct Shipment | FLT | Dedicated Contract | FLT |
| Dunnage | FLT | Deficit Weight | FLT |
| Excess Refer Usage | HRS | Escort/Pilot Car | FLT |
| Equipment Staging Fee | FLT | Exclusive Use of Vehicle | FLT |
| Event | FLT | Excess Miles | MI |
| Expedited Service | FLT | Expandable Trailer | FLT |
| Excess/High Value | FLT | Foreign Carr Cartage | FLT |
| Flatbed Trailer | FLT | Foreign Location Point | FLT |
| Fuel Related Adjustment | FLT | Ferry Charge | FLT |
| Fuel Surcharge | MI | Full Visible Capacity | FLT |
| Canadian Federal Tax | FLT | Hazardous Material | FLT |
| Heated Blanket Charge | FLT | Handling Charge | WD |
| Heavy Haul Load | FLT | Hot Parts Separation | FLT |
| Hopper Services | FLT | Inside Delivery | FLT |
| Insurance Adjustment | FLT | Inbond | FLT |
| Intercity Service | FLT | International Paper/Special Service | FLT |
| Just In Time | FLT | Layover - Overnight | FLT |
| Layover - Weekend | FLT | Layover, Overnight and Weekend | HRS |
| Local Work | FLT | Load Delivery | FLT |
| Load Delivery | FLT | Labor Disturbance Charge | FLT |
| Labor for Crane | FLT | Lift Gate Service | FLT |
| Linehaul | MI | Lumper Service | UNT |
| Labor Other Than Crane | FLT | Lowboy Equipment | FLT |
| LTL Discount Service | UNT | Lift Truck Service | FLT |
| Miscellaneous Allowance | FLT | Mexican Box Stopoff | UNT |
| Miscellaneous Charge | FLT | Motor Surveillance | FLT |
| Non-Contracted Carrier | FLT | Night Delivery | FLT |
| Next Day Service | LBS | New York/Long Island Pickup/Delivery | FLT |
| New York/Long Island Overdimension | FLT | Overdimension Charge | MI |
| Pre Summit GM Bills | FLT | Order Notify Bill of Lading | FLT |
| Out of Route | MI | Outriggers | FLT |
| Pier Charges | FLT | Plant Directed | FLT |
| Pallet Exchange | UNT | Permit Charge | FLT |

TABLE 1-continued

| Service Description | Unit of Measure | Service Description | Unit of Measure |
|---|---|---|---|
| Proof of Delivery | FLT | Promotional Drop | FLT |
| Power Repositioning | FLT | Reconsignment | FLT |
| Required Delivery Date | FLT | Redelivery | MI |
| Return Empty Charge | FLT | Rejected Shipment | FLT |
| Driver Relay | FLT | Removable Gooseneck | FLT |
| Rigging Charge | FLT | Round Robin Charge | FLT |
| Revenue Share | UNT | Satellite Service | FLT |
| Sidewalk Delivery | FLT | Shag Service | FLT |
| Shuttle | FLT | Sides | FLT |
| Simultaneous Pickup/Delivery | FLT | Sold Binders | FLT |
| Slipsheet Load | FLT | Sold Straps | FLT |
| Special Tolls | FLT | Sold Winches | FLT |
| Small Package | FLT | Satellite Motor Surveillance | FLT |
| Supplemental Increase | FLT | Stopoff, Peddle Run | MI |
| Spotting | FLT | Supervan Trailer | FLT |
| Slipsheet Allowance | FLT | Signature Security Service | NULL |
| Storage | DAY | Stopoff | FLT |
| Saturday Pickup or Delivery | FLT | Stopoff Service | FLT |
| Sunday/Holiday Pickup/Delivery | FLT | Sufferance Warehouse | FLT |
| Switching Service | FLT | Van Refrigerated Van | MI |
| 45' Van Trailer | MI | 53' Van Trailer | MI |
| 48' Van Trailer | MI | 45' Van Container | MI |
| 40' Van Container | MI | 20' Van Container | MI |
| 48' Van Container | MI | 53' Van Container | MI |
| 48' Flat Bed | MI | 48' Single Drop Flatbed | MI |
| Open Top trailer | MI | Concerta Van | MI |
| Air Ride Van | MI | Heated Van | MI |
| Flat Bed | MI | Flat Bed with Racks | MI |
| Drop Flatbed with Racks UNCR | MI | Drop Flatbed with Racks - 12 | MI |
| Flatbed with Racks UNCR | MI | Flatbed with Racks - 12 | MI |
| Double Drop Flatbed with Racks - 5 | MI | Double Drop Flatbed with Racks - 6 | MI |
| Road Railer | MI | Reefer Stack | MI |
| 20' Export Container | MI | 40' Export Container | MI |
| 45' Export Container | MI | 48' Export Container | MI |
| 53' Export Container | MI | Piggy Back (TOFC) | MI |
| Transportation Consultant | FLT | Team Service | MI |
| Through Rate | MI | Trailer Interchange | FLT |
| Tire Repair Service | FLT | Termination Fee | FLT |
| Tank Trailer Expandable | FLT | Tolls, Bridge or Tunnel | UNT |
| Tier 2 | FLT | Transaction Fee | FLT |
| On Train | FLT | Tractor Usage | FLT |
| Trailer Repositioning | FLT | Trailer Usage | FLT |
| Terminal Service | FLT | Tarps | UNT |
| Trailer Repair Service | FLT | Trailer Size | FLT |
| Truck/Rail Rate | FLT | Test Service | FLT |
| Test Service | FLT | Thru Trailer Charge | FLT |
| Thru Trailer Mileage | FLT | Unloading Allowance | FLT |
| Van Trailer | FLT | Vancouver Island Mileage | FLT |
| Vehicle Ordered, Not Used | FLT | Weighing Charge | FLT |
| Warehouse Service | FLT | Cross Dock Charge | MI |
| EXP REM Gooseneck | FLT | XXXX Service | FLT |
| Yard Work | FLT | Zee Services | FLT |

Like the rating engines described above, service engines are designed to process different service rate structures which include direct, geography matrices, tiered, and complex combinations of these structures. Like the rating engines described above, service engines are modular and comprise one or more instances of object classes comprising base service engines and collective service engines. Each base and collective engine object class inherits from the abstract class service engine object class 78. All collective service engines inherit from collective service engine object class 80 while all base service engines inherit from base service engine object class 84.

Instances of the base service engines of direct service engine object class 90, zone zone service engine object class 88 and band value service engine object class 86 contain the actual rate data which is made up of service codes, and index type (origin/destination type or band type) tiered type (if applicable), a unit of measure, and an effective date range. In addition to the specific base service engines, there are collective service engines such as selective service engine object class 82. Again, the collective service engines function similarly to the collective rating engines, and contain a list of other service engines which could be base service engines as well as selective service engines, and a method for processing the rating engines in this list.

Each service engine for a carrier contract will be for a specific service code, of a specific service engine type, tiered type (if applicable) unit of measure code, effective start date, and effective end date. Service engines may be arranged in a hierarchical manner using instance variables that indicate the parent of a particular rating engine as well as a priority instance variable indicating the relative priority between service engines. Service engines may also include a date range during which the data stored in that service engine is valid. Thus, the service engines operate similarly to the rating engines.

In fact, an instance of selective service engine object class 82 operates identically to an instance of selective rating engine object class 102, except for the type of object that it operates upon. Accordingly, as will be seen in discussing FIG. 7, it may be somewhat redundant to have both service engine object classes and rating engine object classes. Instead, a more complete set of service engine object classes can be defined to handle all types of services, including the linehaul service handled by the rating engine object classes in this embodiment.

In this embodiment, each instance of carrier contract object class 70 may also be associated with an instance of contract services object class 76. This object class contains a list of service engines that may be used to calculate the price for various services included in a rating request. In this embodiment, an instance of contract services object class 76 is contained in an instance of carrier contract object class 70. However, the function of an instance of contract services object class 76 could be performed by methods and instance variables contained in the carrier contract object.

Tiered services may be implemented with quantity band rate structures, which are similar to mileage and weight band structures implemented with the rating engines. Quantity bands will not have any limitation on the ranges, and will be tied to the service unit of measure. Tiered services can be designated as independent or cumulative. Independent means that each service is rated by itself. Cumulative means that all services of a specific service code must be rated cumulatively. An example of a cumulative service rating is where stopoff services are stored individually for each stop but are rated cumulatively.

Cumulative service rating will be accomplished by passing in the service that needs rating as well as the vector of all services for the request. The service rating method must understand that the service charge is cumulative and look for other services with the same service code as the one being rated. Then it must be determined according to the order of stops where the one being rated falls. With this information, the service can be rated correctly.

As noted above with respect to the rating engines, various changes can be made in the implementation of these service engines without departing from the scope of the invention. Some of the changes and alterations include changes and alterations similar to those described in connection with the rating engines above.

Figure 7:
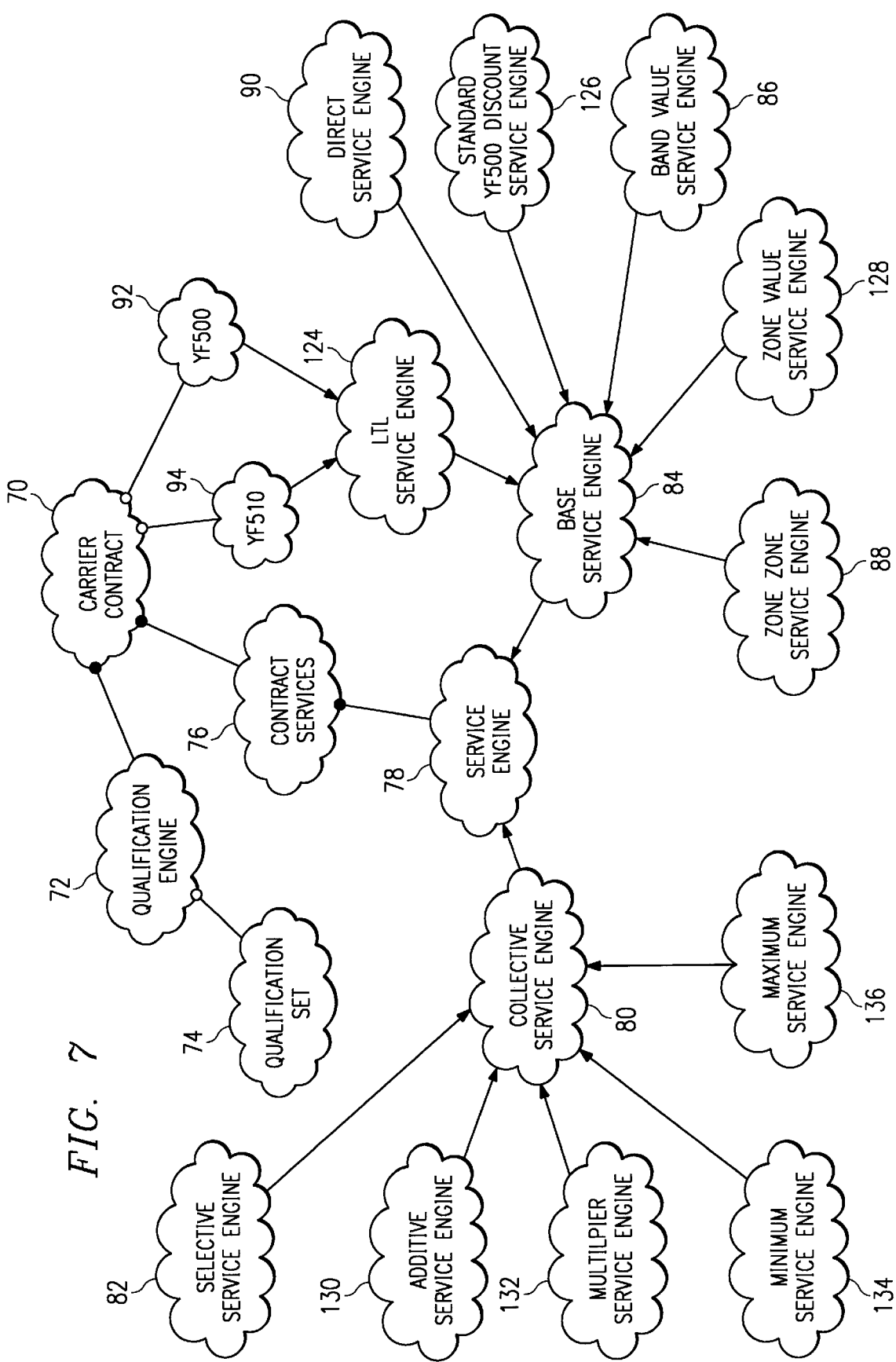
FIG. 7 illustrates an object class diagram of a portion of a second embodiment of a computerized rating system constructed in accordance with the invention.

FIG. 7 illustrates a class diagram of a portion of a second embodiment of a computerized rating system constructed in accordance with the invention. In this embodiment, the rating engine has been eliminated and its functions are performed by a service engine. Accordingly, a carrier contract in such an embodiment is associated only with a qualification engine and a service engine. The cost of linehaul service, as well as all other services, is calculated by the service engine. As noted above, this means that the cost of linehaul service calculated by the rating engine in the embodiment illustrated in FIG. 6 can be considered to be just a special type of service that may be calculated by the service engine in this embodiment. The service engines that calculate the cost of linehaul service may still be referred to as rating engines or may be referred to as service engines.

Several new object classes have been added to this embodiment, including LTL service engine object class 124, standard YF 500 discount service engine object class 126, zone value service engine object class 128, additive service engine object class 130, multiplier service engine object class 132, minimum service engine object class 134, and maximum service engine object class 136. The function performed by instances of these object classes is identical to the function of the similarly named rating engine object class in FIG. 6. Here, the engines are more generically referred to as service engines, as they may be used to calculate the cost of services other than linehaul services. Their operation, however, is similar to the operation of the embodiments illustrated in FIG. 6.

This embodiment of the invention thus provides the same modular approach as the embodiment illustrated in FIG. 6, although only a single collection of base and collective engines making up a service engine is provided.

FIG. 8 illustrates an object diagram of a portion of a carrier contract implemented in accordance with the embodiment illustrated in FIG. 6. This carrier contract includes carrier contract object 138, additive rating engine 140, selective rating engine 142, zone value rating engine 144, zone zone rating engine 146, zone zone rating engine 148, and zone zone rating engine 150.

Carrier contract object 138 comprises an instance of carrier contract object class 70. Additive rating engine object 140 comprises an instance of additive rating engine class 104. Selective rating engine object 142 comprises an instance of selective rating engine object class 102. Zone value rating engine object 144 comprises an instance of zone value rating engine object class 116. Zone zone rating engines 146, 148, and 150 comprise instances of zone zone rating engine object class 114.

This example will be used to illustrate how modular rating engines can be constructed in accordance with the invention. It will also indicate the operation of a rating engine constructed in accordance with the invention and illustrate how a collective rating engine uses an ordered list of rating engines organized according to precedence and date range.

When carrier contract object 138 receives a rating request, and determines that it is qualified to process that request, it then generates a message that is passed to additive rating engine object 140 to calculate a rate. Additive rating engine 140 contains a vector comprising selective rating engine object 142, and zone value rating engine object 144. Additive rating engine 140 will add the results of the rates calculated by selective rating engine object 142, and zone value rating engine 144. Accordingly, additive rating engine 140 first generates a message to selective rating engine 142 to determine a rate and then generates a similar message to zone value rating engine 144. After these rates have been calculated, the rates are added and returned to carrier contract object 138.

Selective rating engine 142 also maintains an ordered list of rating engines, in this case, zone zone rating engine object 146, zone zone rating engine object 148, and zone zone rating engine object 150. In this example, the first object on the ordered list comprises zone zone rating engine 146 because this object has a priority value (precedence) that is higher than any other object on the list. The second and third entries on the list are zone zone rating engine object 148 followed by zone zone rating engine 150. Although zone zone rating engine 148 and zone zone rating engine 150 have an equal priority value (precedence) zone zone rating engine 148 has a start date value that is later in time than the start date value for zone zone rating engine 150. Accordingly, zone zone rating engine object 148 has a higher order in the list in this embodiment.

It should be noted that zone zone rating engine object 146 is a zip 5 to zip 5 zone zone rating engine while zone zone rating engine objects 148 and 150 are zip 3 to zip 3 type zone zone rating engine objects. The higher precedence of the zip 5 to zip 5 zone zone rating engine may indicate that the carrier prefers to bill the customer based upon the five digit zip code but will bill the customer based upon three digit zip codes in certain instances.

In operation, the selective rating engine object 142, after receiving a message to calculate a rate from additive rating engine object 140, will first pass a message to zone zone rating engine object 146 to attempt to calculate a rate. If zone zone rating engine 146 returns a rate, then selective rating engine object 142 returns this rate in response to the message from additive rating engine object 140. If zone zone rating engine 146 returns a rate not found message, then selective rating engine will send a message to zone zone rating engine object 148 in requesting it to calculate a rate. If it returns a rate, then that rate would be returned in response to the message from additive rating engine object 140. Otherwise, if a rate not found message is returned, then selective rating engine object 142 will then generate a message to zone zone rating engine object 150. Selective rating engine object 142 will then return either (1) the rate returned by zone zone rating engine 150 or (2) a rate not found message if zone zone rating engine 150 returns a rate not found message in response to the message generated by selective rating engine object 142.

Each of the zone zone rating engine objects 146, 148, and 150 will make sure that the date included with the rating request falls within the date range specified by the start date and end date associated with the particular rating engine object. Notice that the date ranges may overlap. A computerized rating system constructed in accordance with the invention may maintain rating engines that may no longer be used for new shipments because the end date associated with that rating engine is now earlier in time than the date on which the rating engine is being used. In other words, all of the rates associated with that rating engine have expired. The rating engine may still be maintained by the computerized rating system, however, for purposes of generating bills for the shipment, a check, invoice or payment for the shipment, and/or for report or auditing purposes.

Although the present invention has been described in detail, it should be understood that various changes, substitutions, and alterations can be made hereto without departing from the spirit and scope of the invention as defined by the appended claims.

What is claimed is:

1. An object-oriented rating engine operable to receive a rating request associated with a carrier contract, the rating engine comprising:
    a first base rating engine object operable for use on a computer and further operable to calculate a line haul rate in response to the rating request, the first base rating engine object comprising an instance of an object class that inherits, either directly or indirectly, from a base rating engine object class, the first base rating engine object further comprising
    a rating method operable to calculate the line haul rate, and
    a rate data structure comprising at least one rate value, the rate data structure accessible by the rating method for use in calculating the line haul rate.

2. The object-oriented rating engine of claim 1, wherein the rating method is operable to calculate a line haul rate of a type selected from the group consisting of zip 5 value, zip 3 value, state value, country value, splc value, zip 5 to zip 5, splc to splc, splc to zip 3, splc to state, zip 3 to splc, zip 3 to zip 3, zip 3 to state, state to splc, state to zip 3, zip 3 range to zip 3 range, state to state, country to country, mileage band value, yellow 500, yellow 510, and direct charge.

3. The object-oriented rating engine of claim 1, wherein the first base rating engine object is contained in a carrier contract object, the carrier contract object comprising a collection of data representing contract terms.

4. The object-oriented rating engine of claim 1, wherein the first base rating engine object is used by a carrier contract object, the carrier contract object comprising a collection of data representing contract terms.

5. The object-oriented rating engine of claim 1, wherein the first base rating engine object further comprises a start date value and end date value collectively denoting a period of time for which the rate data structure provides valid data.

6. The object-oriented rating engine of claim 5, wherein the first base rating engine object will not calculate the line haul rate if a date parameter provided with the rating request does not fall within the date range between the start date value and end date value.

7. The object-oriented rating engine of claim 1, wherein the first base rating engine object is contained in a contract services object, the contract services object containing at least one base service engine object, the contract services object associated with a carrier contract object, the carrier contract object comprising a collection of data representing contract terms.

8. The object-oriented rating engine of claim 7, wherein the first base rating engine object further comprises a start date value and end date value collectively denoting a period of time for which the rate data structure provides valid data.

9. The object-oriented rating engine of claim 8, wherein the first base rating engine object will not calculate the line haul rate if a date parameter provided with the rating request does not fall within the date range between the start date value and end date value.

10. The object-oriented rating engine of claim 1, further comprising:
    a first collective rating engine object operable for use on a computer and further operable to calculate a second line haul rate in response to the rating request, the collective rating engine object further comprising
    a rating engine data structure operable to maintain an association between the collective rating engine object and the first base rating engine object and at least a second base rating engine object, and
    a collective rating method operable to calculate the second line haul rate in response to the rating request by performing an operation on line haul rates calculated by the first base rating engine object and the second base rating engine object.

11. The object-oriented rating engine of claim 10, wherein the operation performed by the collective rating method comprises a function selected from the group consisting of prioritized selection of line haul rates, addition of line haul rates, multiplication of line haul rates, minimum line haul rate, and maximum line haul rate.

12. The object-oriented rating engine of claim 10, wherein the rating engine data structure is further operable to maintain an association between the collective rating engine object and a second collective rating engine object.

13. The object-oriented rating engine of claim 10, wherein the first base rating engine object and the second base rating engine object are each operable to return a rate not found message if a rate cannot be calculated by that base rating engine object in response to the rating request;
    wherein the first collective rating engine object comprises a selective rating engine object;
    wherein the rating engine data structure of the first collective rating engine object further comprises an ordered list of base rating engine objects and collective engine objects organized by a priority assigned to each base rating engine object and collective engine object; and
    wherein the first collective rating engine is further operable to calculate the second line haul rate in response to the rating request, the second line haul rate calculated by traversing the rating engine data structure and attempting to calculate a line haul rate using a base rating engine object or collective rating engine object associated with a particular entry on the list, returning a line haul rate calculated by the first entry on the list for which a line haul rate could be calculated and returning a rate not found result if no entry on the list could calculate a line haul rate.

14. The object-oriented rating engine of claim 13, wherein each base rating engine object further comprises a start date value and end date value collectively denoting a period of time for which the rate data structure provides valid data.

15. The object-oriented rating engine of claim 14, wherein the rating engine data structure is secondarily ordered according to the start date value.

16. An object-oriented rating system, comprising:
    at least one carrier contract object, the carrier contract object operable to receive a rating request and operable for use on a computer;
    a first base rating engine object operable for use on a computer and further operable to calculate a line haul rate in response to the rating request, the first base rating engine object comprising an instance of an object class that inherits, either directly or indirectly, from a base rating engine object class, the first base rating engine object further comprising a rating method operable to calculate the line haul rate, and a rate data structure comprising at least one rate value, the rate data structure accessible by the rating method for use in calculating the line haul rate.

17. The object-oriented rating system of claim 16, wherein the first base rating engine object is contained in the at least one carrier contract object, the at least one carrier contract object comprising a collection of data representing contract terms.

18. The object-oriented rating system of claim 16, wherein the first base rating engine object is contained in a contract services object, the contract services object operable to receive messages from the at least one carrier contract object.

19. The object-oriented rating system of claim 16, further comprising:

a second base rating engine object;

a first collective rating engine object operable for use on a computer and further operable to calculate a second line haul rate in response to the rating request by performing an operation on line haul rates calculated by the first base rating engine object and a second base rating engine object.

20. The object-oriented rating system of claim 16, further comprising:

a plurality of additional base rating engine objects;

at least one collective rating engine object;

wherein the first base rating engine object, the additional base rating engine objects, and the at least one collective rating engine object are associated with one another in a tree-like structure such that each base rating engine object comprises a leaf node of the tree-like structure and each collective rating engine object comprises a non-leaf node of the tree-like structure.

21. The object-oriented rating system of claim 16, further comprising:

at least one collective rating engine object operable for use on a computer, each collective rating engine object further comprising a rating engine data structure operable to maintain an association between the collective rating engine object and a plurality of operand rating engine objects wherein the operand rating engine objects comprise either collective rating engine objects or base rating engine objects, and wherein the first base rating engine object comprises one of the operand rating engine objects and a collective rating method operable to calculate a second line haul rate in response to the rating request by performing an operation on line haul rates calculated by at least one of the operand rating engine objects.

22. The object-oriented rating system of claim 21, wherein the rating engine data structure comprises an ordered list of the operand rating engine objects ordered according to a priority assigned to each of the operand rating engine objects.

23. The object-oriented rating system of claim 21, wherein each operand rating engine object further comprises a start date value and end date value collectively denoting a period of time for which the operand rating engine object provides valid data; and wherein the rating engine data structure comprises an ordered list of the operand rating engine objects ordered according to the start date value of each of the operand rating engine objects.

24. The object-oriented rating system of claim 23, wherein the ordered list is ordered from a latest start date value to an earliest start date value.

25. The object-oriented rating system of claim 22, wherein each operand rating engine object further comprises a start date value and end date value collectively denoting a period of time for which the operand rating engine object provides valid data; and wherein the rating engine data structure comprises an ordered list of the operand rating engine objects ordered primarily according to a priority assigned to each of the operand rating engine objects and secondarily according to the start date value of each of the operand rating engine objects.

26. The object-oriented rating system of claim 21, wherein the rating request comprises a date parameter; and wherein the operand rating engine objects and the at least one collective rating engine object further comprise a start date value and end date value collectively denoting a period of time in which the date parameter must be included for the operand rating engine objects and the at least one collective rating engine object to compute a valid line haul rate in response to the rating request.

27. The object-oriented rating system of claim 16, wherein the first base rating engine object further comprises a start date value and end date value, collectively denoting a range of ship dates for which each rate value in the rate data structure is valid.

28. A method for processing rating requests in a computer rating system, comprising:

receiving a first rating request with a base rating engine object, the base rating engine object operable for use on a computer and comprising an instance of an object class that inherits, either directly or indirectly, from a base rating engine object class, the first rating request associated with a carrier contract and comprising source data and destination data, wherein the base rating engine object comprises a rating method operable to calculate a line haul rate, and a rate data structure comprising at least one rate value, the rate data structure accessible by the rating method for use in calculating the line haul rate;

calculating a first line haul rate using the rating method in response to the first rating request.

29. The method of claim 28, wherein the base rating engine object further comprises a start date value and end date value collectively denoting a range of ship dates for which each rate value in the rate data structure is valid.

30. The method of claim 29, wherein the step of calculating the first line haul rate further comprises:

calculating the first line haul rate using the rating method in response to the first rating request if a date parameter provided with the first rating request falls within the date range between the start date value and end date value.

31. The method of claim 28, wherein the base rating engine object further comprises a start date value and end date value collectively denoting a range of ship dates for which the base rating engine object is capable of calculating the first line haul rate.

32. The method of claim 31, wherein the base rating engine object is contained in a contract services object, the contract services object containing at least one base service engine object, the contract services object associated with a carrier contract object, the carrier contract object comprising a collection of data representing contract terms.

33. The method of claim 28, further comprising:

receiving a second rating request with a first collective rating engine object operable for use on a computer, each collective rating engine object further comprising a rating engine data structure operable to maintain an association between the collective rating engine object and a plurality of operand rating engine objects wherein the operand rating engine objects comprise either collective rating engine objects or base rating engine objects, and wherein the base rating engine object comprises one of the operand rating engine objects, and a collective rating method operable to calculate a second line haul rate in response to the second rating request by performing an operation on line haul rates calculated by at least one of the operand rating engine objects, wherein the collective rating method is further operable to generate the first rating request.

34. The method of claim 33, wherein the rating engine data structure comprises an ordered list of the operand rating engine objects ordered according to a priority assigned to each of the operand rating engine objects.

35. The method of claim 33, wherein each operand rating engine object further comprises a start date value and end date value collectively denoting a period of time for which the operand rating engine object provides valid data; and wherein the rating engine data structure comprises an ordered list of the operand rating engine objects ordered according to the start date value of each of the operand rating engine objects.

36. The method of claim 33, wherein each operand rating engine object further comprises a start date value and end date value collectively denoting a period of time for which the operand rating engine object provides valid data; and wherein the rating engine data structure comprises an ordered list of the operand rating engine objects ordered primarily according to a priority assigned to each of the operand rating engine objects and secondarily according to the start date value of each of the operand rating engine objects.

37. A method of organizing rate data in an object oriented rating system, comprising:

associating at least one base rating engine object with a carrier contract object, the at least one base rating engine object comprising a start date value and an end date value, the base rating engine object comprising an instance of an object class that inherits, either directly or indirectly, from a base rating engine object class;

creating a rate data structure within the at least one base rating engine object, the rate data structure comprising at least one rate data value, wherein each rate data value in the rate data structure is valid data for calculating a line haul rate for a shipment occurring between the start date value and end date value.

* * * * *